(12) United States Patent
Hugon et al.

(10) Patent No.: US 10,385,872 B2
(45) Date of Patent: Aug. 20, 2019

(54) VARIABLE PITCH RECTIFIER FOR A TURBOMACHINE COMPRESSOR COMPRISING TWO INNER RINGS

(71) Applicant: SAFRAN AIRCRAFT ENGINES, Paris (FR)

(72) Inventors: Nadege Hugon, Montgeron (FR); Jacques Rene Bart, Soisy sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 507 days.

(21) Appl. No.: 14/389,889

(22) PCT Filed: Mar. 28, 2013

(86) PCT No.: PCT/FR2013/050691
§ 371 (c)(1),
(2) Date: Oct. 1, 2014

(87) PCT Pub. No.: WO2013/150224
PCT Pub. Date: Oct. 10, 2013

(65) Prior Publication Data
US 2015/0071768 A1 Mar. 12, 2015

(30) Foreign Application Priority Data
Apr. 3, 2012 (FR) .................................... 12 53024

(51) Int. Cl.
*F04D 29/56* (2006.01)
*F01D 11/00* (2006.01)
(Continued)

(52) U.S. Cl.
CPC .......... *F04D 29/563* (2013.01); *F01D 11/001* (2013.01); *F01D 17/162* (2013.01);
(Continued)

(58) Field of Classification Search
CPC .............................. F04D 29/563; F01D 17/162
(Continued)

(56) References Cited

U.S. PATENT DOCUMENTS 3,079,128 A 2/1963 Burge
4,604,030 A * 8/1986 Naudet ................. F01D 11/001
 415/126

(Continued)

FOREIGN PATENT DOCUMENTS

DE 10 2008 032 661 1/2010
EP 1 205 638 5/2002
(Continued)

OTHER PUBLICATIONS

International Search Report dated Jul. 31, 2013 in PCT/FR13/050691 Filed Mar. 28, 2013.

*Primary Examiner* — Christopher Verdier
*Assistant Examiner* — Michael L Sehn
(74) *Attorney, Agent, or Firm* — Oblon, McClelland, Maier & Neustadt, L.L.P.

(57) ABSTRACT

A variable pitch rectifier for a compressor includes a plurality of radial vanes having respectively, at outer and inner ends of same, outer and inner pivots, the inner pivots being received between two upstream and downstream inner rings, which are assembled by a link device. The link device includes only a set of angular sectors of elastically deformable stirrups, arranged to grip together the inner peripheral edges of the upstream and downstream rings by clamping one against the other.

12 Claims, 3 Drawing Sheets

(51) Int. Cl.
 F01D 17/16 (2006.01)
 F04D 19/00 (2006.01)
(52) U.S. Cl.
 CPC ...... *F04D 19/00* (2013.01); *F05D 2220/3219* (2013.01); *F05D 2260/30* (2013.01); *F05D 2260/38* (2013.01); *F05D 2300/501* (2013.01); *Y02T 50/671* (2013.01)
(58) Field of Classification Search
 USPC .................................................. 415/160, 162
 See application file for complete search history.

(56) References Cited

U.S. PATENT DOCUMENTS

| | | | | |
|---|---|---|---|---|
| 4,706,354 | A * | 11/1987 | Naudet | F01D 17/162 29/428 |
| 6,129,512 | A * | 10/2000 | Agram | F01D 17/162 415/160 |
| 6,413,043 | B1 | 7/2002 | Bouyer | |
| 6,481,960 | B2 * | 11/2002 | Bowen | F01D 11/001 415/160 |
| 6,682,299 | B2 * | 1/2004 | Bowen | F01D 9/02 384/273 |
| 7,458,771 | B2 * | 12/2008 | Abadie | F01D 9/042 415/160 |
| 7,854,586 | B2 * | 12/2010 | Major | F01D 11/001 415/160 |
| 2008/0219832 | A1 | 9/2008 | Major et al. | |
| 2008/0298955 | A1 | 12/2008 | Major et al. | |
| 2009/0060722 | A1 | 3/2009 | Cloarec | |
| 2009/0208338 | A1 | 8/2009 | Major et al. | |

FOREIGN PATENT DOCUMENTS

| | | |
|---|---|---|
| EP | 1 967 718 | 9/2008 |
| EP | 1 998 006 | 12/2008 |
| EP | 2 031 254 | 3/2009 |
| EP | 2 093 380 | 8/2009 |

* cited by examiner

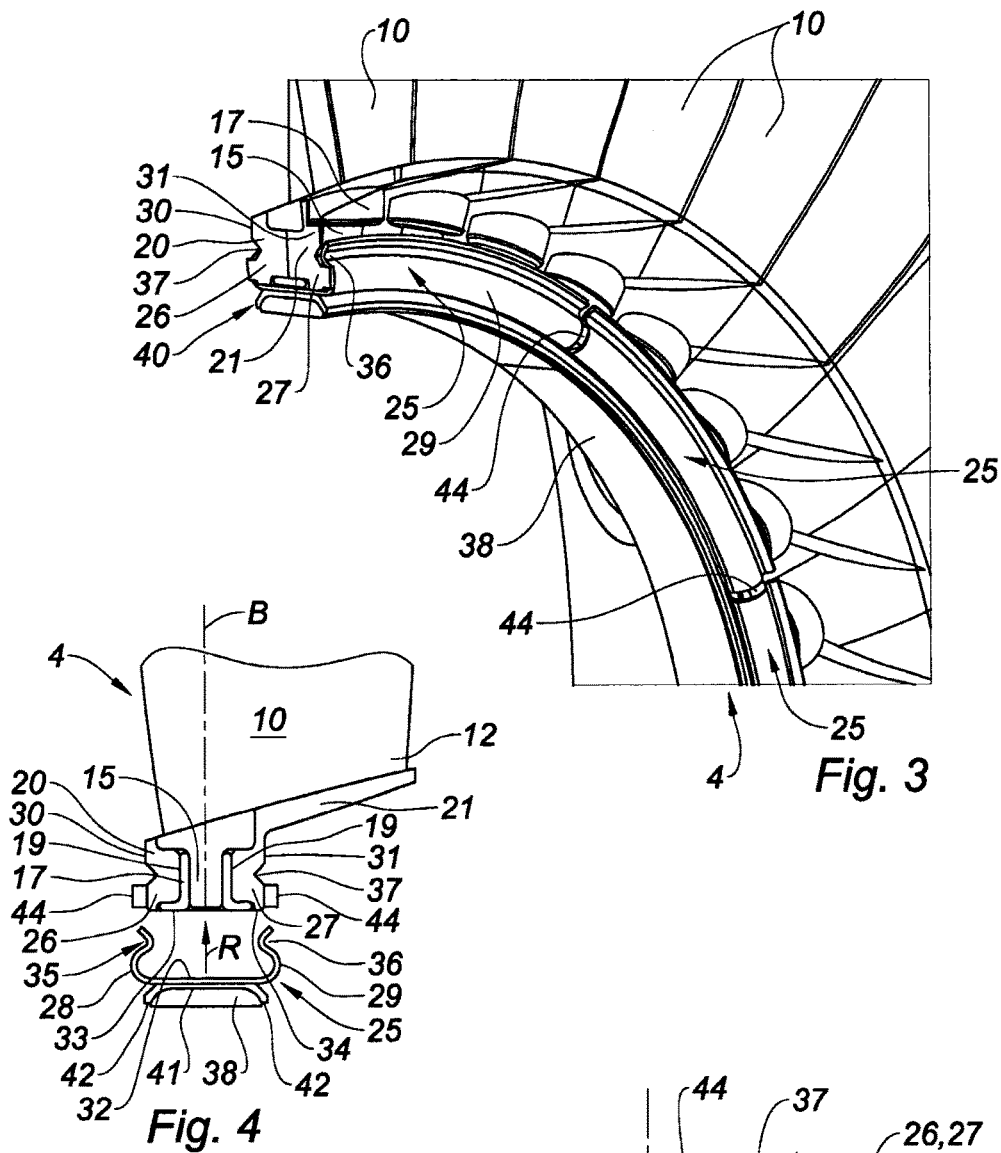
Fig. 3
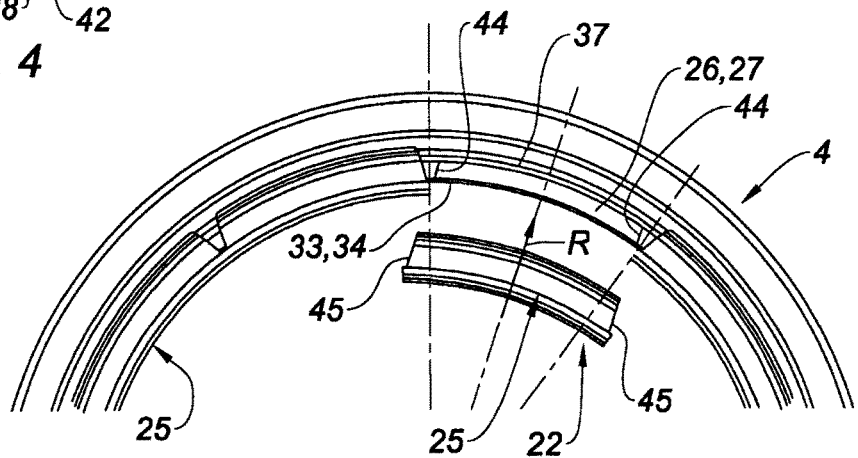
Fig. 4
Fig. 5

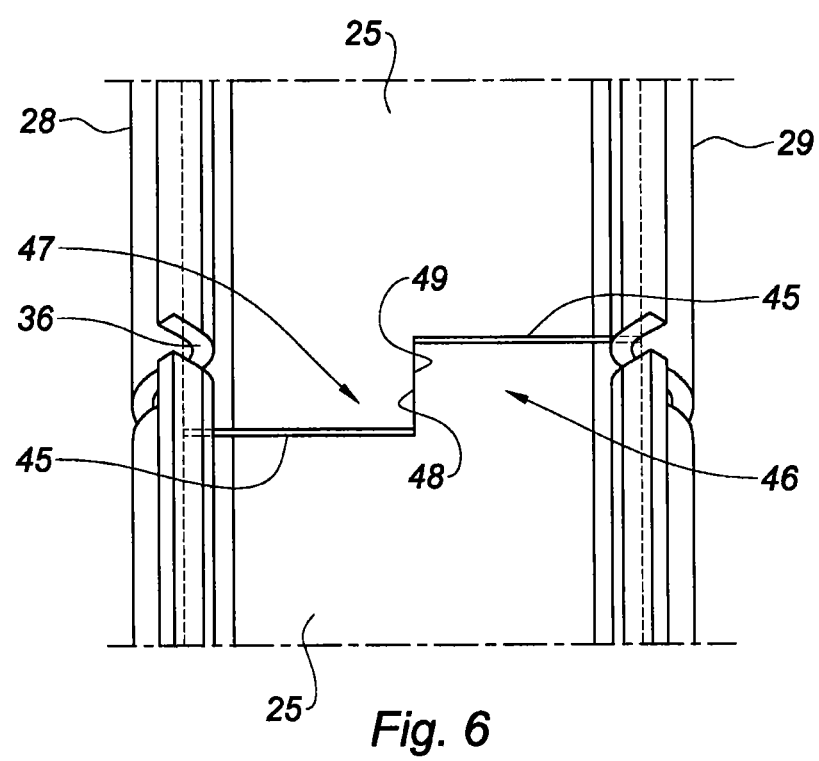

VARIABLE PITCH RECTIFIER FOR A TURBOMACHINE COMPRESSOR COMPRISING TWO INNER RINGS

BACKGROUND OF THE INVENTION

Field of the Invention

The present invention relates to variable pitch rectifiers for a turbine engine compressor, particularly to the rectifiers for a high-pressure compressor of a turbojet engine or a turboprop engine of an aircraft.

Description of the Related Art

It is known that the compressors for a turbojet engine generally comprise a plurality of successive stages that are aligned along the longitudinal axis of the engine and are alternately composed of movable stages, forming the rotors or wheels of the compressor and of which the blading accelerates the gas stream by diverting said stream relative to said axis, and of fixed stages, forming the stators or rectifiers and of which the blading partially converts the speed of the stream into pressure and distribute this pressure towards the next movable stage.

These rectifiers, particularly those that occupy the first stages of the compressor, are referred to as variable pitch rectifiers, i.e. their radial vanes, even though they are rotationally fixed relative to the axis of the compressor, can rotate about their own axis so as to bring the airflow passing through the vanes of the rotors into the axis of the compressor, regardless of the speed of rotation of said rotors.

Furthermore, in these stages, the vanes of the rectifiers comprise, at their outer and inner ends, aligned pivots forming the pivot axis of the vanes. For this purpose, the pivots of the outer ends (or heads) cooperate with housings provided in a fixed outer casing of the compressor, and the pivots of the inner ends (or feet) are received in housings formed by two rings, which are respectively upstream and downstream (relative to the gas flow in the compressor), assembled together via a connection device such as bolts or the like.

If there is a small number of vanes on the variable pitch rectifiers, the bolts are arranged between the successive pivots of the inner ends of the rectifiers and pass through the upstream and downstream rings. However, if there is a large number of vanes, particularly on small engines, the pitch between two successive pivots is insufficient for the installation of bolts. In this case, the inner ends of the rings are radially extended inwards, under the pivots, to allow the assembly of the bolts of the connection device and, subsequently, the clamping of the two back-to-back rings of each rectifier, as is the case in the document EP-1.998.006-A2.

If, however, the actual fixing of the pivots of the lower ends is properly provided, this solution results in an increase in the radial spatial requirement of the rings, which poses problems in terms of the spacing and the stiffness of the compressor by forcing the annular lateral walls of the rotor discs, from which the relevant vanes emanate, to be separated from the gas flow circulation duct.

Furthermore, this increase in the spatial requirement is even more detrimental as abradable material supports need to be taken into account that are normally provided at the periphery of the joined upstream and downstream rings of the rectifiers in order to provide the sealing using lip seals (strips) provided on the walls of the rotor discs.

In order to overcome these problems, solutions have been provided by dispensing with the bolts as a connection device.

Firstly, the document U.S. Pat. No. 3,079,128 contemplated eliminating the upstream and downstream rings and replacing them with a series of arc-shaped elements in the form of a case and receiving the pivots, said elements being assembled by elastically deformable stirrups. This architecture does not provide the required stiffness.

In the case of a compressor architecture having a mating surface, with casings each assembled at 180°, the sliding of 180° half-rings forming the connection device has also been contemplated in order to connect upstream and downstream inner half-rings, with the upstream and downstream rings in this architecture each being formed by two half-rings each assembled at 180°. However, this solution can only be mounted on a half-shell compressor (180°) structure and is not applicable to a compressor architecture with 360° casings and rings.

In a further example, the pivots of the inner ends of the vanes of the rectifiers have been dispensed with completely, which overcomes the need for the connection device and allows the annular lateral walls of the rotor discs to be brought along the duct in the best possible manner. However, such a solution means that the vanes of the rectifier disc need to be mounted as an overhang, which vanes are only held by the pivots of the outer ends, which causes a boundary layer phenomenon with a reduction in the performance of the compressor and lower mechanical resistance.

BRIEF SUMMARY OF THE INVENTION

The object of the present invention is to overcome these disadvantages.

To this end, the variable pitch rectifier for a compressor, of the type comprising a plurality of radial vanes having outer and inner pivots at their outer and inner ends respectively, with the inner pivots being received between two upstream and downstream inner rings that are assembled via a connection device, is noteworthy in that the device for connecting the rings comprises only one set of angular sectors of elastically deformable stirrups arranged so as to grip the inner peripheral edges of said upstream and downstream rings by clipping them together.

Therefore, by virtue of the invention, such a connection device using arc-shaped sectored stirrups, similar to clips and successively arranged around the inner periphery of the two rings, allows the radial spatial requirement of the rectifiers to be reduced compared with the previous embodiments with bolts (when the vanes are very close together) and improves the stiffness of the compressor, with the walls of the rotor discs being as close as possible to the internal flow vein. This compact solution of the invention, without bolts, advantageously can be applied to compressor architectures with 360° single-piece casings and, therefore, to 360° inner rings. Of course, resilient arc-shaped stirrups can also be used to fix half-rings of 180° (or other values) in the case of a compressor architecture of this type.

Furthermore, this connection device allows the pivots of the inner ends of the vanes to be preserved, avoiding the aerodynamic and mechanical problems resulting from their elimination in the aforementioned earlier solution.

Preferably, the sectored stirrups have a cross section that is substantially U-shaped or of similar shape.

Therefore, their assembly is facilitated from the inside of the back-to-back upstream and downstream rings by radially displacing them outwards after the engagement of the inner peripheral edges of the rings between the wings of the elastically deformable stirrups up to the bottom of said stirrups.

Advantageously, in order to strengthen the holding of the stirrups relative to the upstream and downstream inner rings, the sectored stirrups of the connection device are provided with a means for holding said clipped rings.

In a particular embodiment, the holding means is arranged on the opposing wings of the sectored stirrups and comprises inner ledges respectively projecting towards the inside of each stirrup and capable of engaging in notches correspondingly provided in outer transverse faces of the assembled rings.

According to a further feature, a support for receiving an abradable material is associated with each of the sectored stirrups.

Therefore, the same assembly forms the connection device and the abradable material by associating two functions, which particularly simplifies production and assembly.

Preferably, each support is fixed by being welded to the outside of the bottom of the corresponding sectored stirrup and extends along the bottom of each stirrup in order to receive the abradable material.

Furthermore, the sectored stirrups are rotationally immobilised relative to said assembled rings, which particularly facilitates their assembly.

According to one embodiment, the rotational immobilisation of said sectored stirrups is obtained by rotation stop studs laterally projecting from transverse faces of said assembled rings and, between two consecutive studs, the transverse end faces of a stirrup are engaged.

In order to provide the axial seal between the stirrups, along the axis of the rings, the transverse end faces of said stirrups are stepped so that a stepped face of a stirrup cooperates with a complementary stepped face of a contiguous stirrup.

The invention further relates to a turbine engine compressor, such as a high-pressure compressor of a turboshaft engine, comprising an alternating succession of wheels forming rotors and of rectifiers forming stators.

Advantageously, it comprises variable pitch rectifiers as previously described.

BRIEF DESCRIPTION OF THE SEVERAL VIEWS OF THE DRAWINGS

The figures of the accompanying drawing will show how the invention can be produced. In these figures, identical reference numerals denote similar elements.

FIG. 3 is a partial perspective view of the rectifier with the inner rings clipped by the resilient stirrups of the connection device.

FIGS. 4 and 5 show the assembly of one of the stirrups of the device for connecting the two inner rings, respectively as transverse and front views of said rings.

FIG. 6 is a partial plan view showing two consecutive stirrups in axial contact with each other.

DETAILED DESCRIPTION OF THE INVENTION

Figure 1:
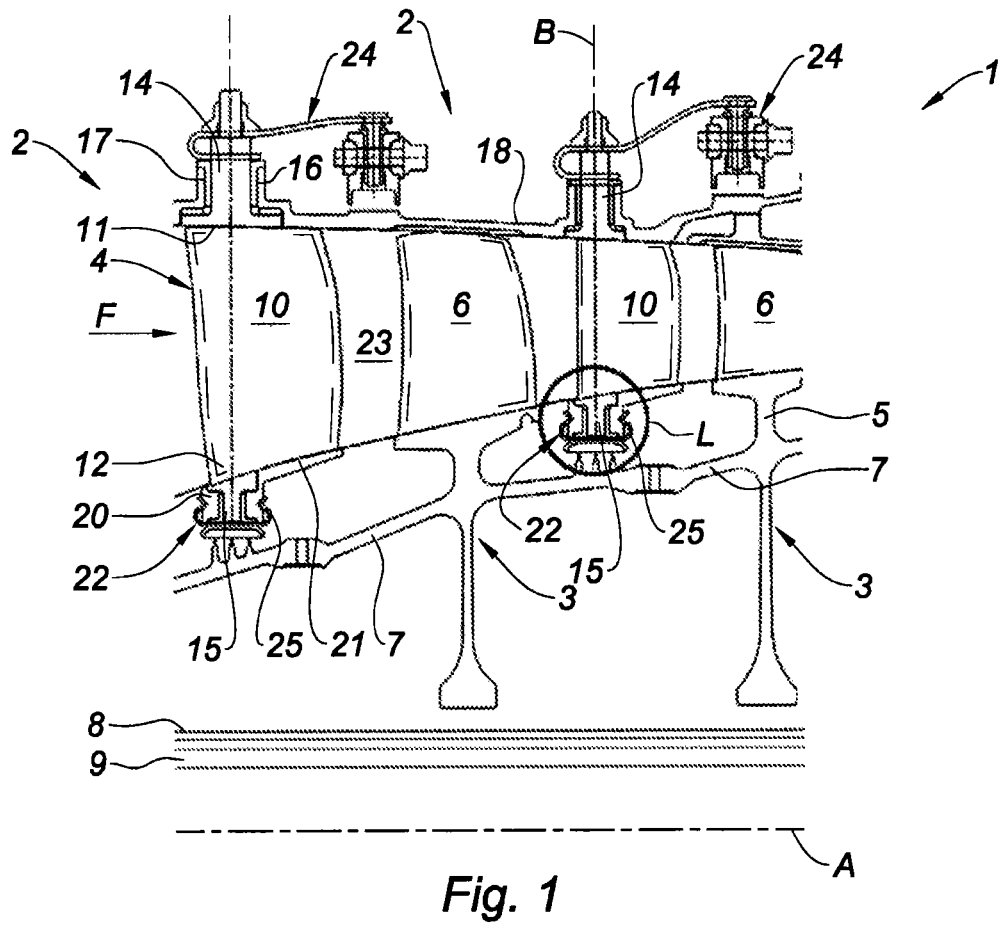
FIG. 1 is a longitudinal and partial sectional view of a turbine engine compressor comprising variable pitch rectifiers, with upstream and downstream inner rings, assembled via a connection device according to the invention.

The part of a compressor 1 shown in FIG. 1 is that of a high-pressure compressor of a turboshaft engine of axis A for an aircraft and shows successive stages 2 alternately composed of rotors or wheels 3 and of stators or, in the application disclosed according to the invention, of variable pitch rectifiers 4.

Each wheel 3 shown comprises a disc 5, at the periphery of which vanes 6 are radially provided, and which extends laterally and on either side via annular lateral walls 7 that fix to corresponding lateral walls of adjacent rotor discs. These discs 5 of a rotor 3 surround the low-pressure shaft 9 and the tie rod 8 of the high-pressure body, which are concentric.

Each rectifier 4 comprises radial vanes 10 disposed between the vanes 6 of the wheels, the outer 11 and inner 12 ends of which are provided with pivots 14, 15 to allow these vanes 10 in this type of rectifier (even though they are rotationally fixed relative to the axis A) to have a variable pitch, as will be seen hereafter. These pivots 14, 15 thus form cylindrical joints.

In particular, the pivots 14 of the outer ends or heads 11 are received, by means of bushes 17, in housings 16 of a fixed outer casing 18 of the compressor.

Figure 2:
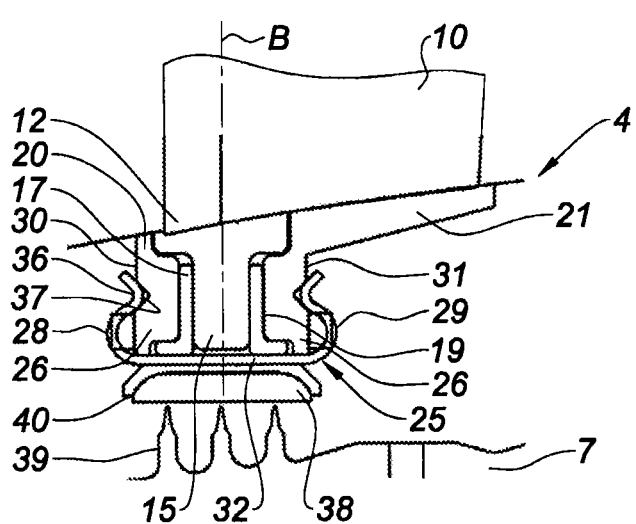
FIG. 2 is an focused view L of the device for connecting the rings of a rectifier in FIG. 1.

By contrast, as is more clearly shown in FIG. 2 (which is an focused view L of FIG. 1) and FIGS. 3 and 4, the pivots 15 of the inner ends or feet 12 are received, also by means of bushes 17, in cylindrical half-housings 19 of rings 20, 21 that are back-to-back and fixed together by a connection device 22 according to the invention.

Prior to the description of this device 22, the outer casing 18 and the successive discs 5 and rings 20, 21 delimit the annular duct 23 for this part of the compressor 1, in which part the gas flow or stream, shown by the arrow F in FIG. 1, circulates in the upstream to downstream direction of said compressor and passes through the radial vanes 6 and 10.

With regard to this flow F, the back-to-back rings of the rectifiers are referred to as upstream 20 and downstream 21 rings and form, after the installation of the connection device 22, a single, complete ring. The production of two distinct rings is particularly necessary due to the 360° architecture of the single-piece casing compressor, which requires the provision of two upstream and downstream rings for the assembly of the vanes 10.

The two cylindrical pivots 14, 15 of each radial vane 10 are aligned along an axis B (which can be perpendicular to the axis A) so that the vanes of each variable pitch rectifier can turn about their axis B using a specific control system 24, of which part can be seen in FIG. 1. Of course, the vanes of the rectifier are rotationally fixed relative to the axis A.

In order to hold the two upstream and downstream rings 20, 21 of each rectifier 4 (FIG. 2-4), the connection device 22 comprises only one plurality of angular sectors of elastically deformable stirrups 25 designed to grip, in the same way as clips (by clipping), the periphery of the inner edges 26, 27 of the rings 20, 21. These stirrups 25 are identical and have a substantially U-shaped cross section with lateral and opposing wings 28, 29 capable of being applied against the outer transverse faces 30, 31 of the rings 20, 21, at the edges 26, 27 respectively, whereas the bottom or base 32 of these stirrups is designed to come into abutment against the inner rim 33, 34 of the rings. The assembly of the sectored stirrups 25, successively placed one after the other, therefore surrounds the whole of the inner peripheral edges 26, 27 of said rings.

Before further describing the structure of the stirrups and their assembly on the rings, it will be noted that the arrangement of such stirrups does not increase the radius of the rings of the stators (as opposed to the previous bolt solutions), so that the lateral walls 7 of the discs 5 of the rotors 3 remain close to the profile of the vane, which promotes the stiffness of the rotor assembly of the compressor.

As shown in FIGS. 2, 3 and 4, the stirrups 25 each comprise a means 35 for holding the upstream and downstream rings in order to strengthen the connection. In this embodiment, the holding means 35 is formed by two ledges 36 symmetrically arranged near the free tip of the wings 28, 29 and turned towards each other. These ledges 36 have a rounded shape in order to facilitate the assembly of the stirrups 25 and so as not to damage the rings. Furthermore, in order to receive these ledges 36, corresponding circumferential notches 37 are provided in the transverse faces 30, 31 of the rings.

Moreover, each stirrup 25 is advantageously provided with an abradable material 38 designed to make contact, for sealing purposes, with lip seals 39 (strips) provided opposite the lateral walls 7 of the discs 5 (FIGS. 1 and 2).

To this end, a support 40 is placed on the outer back of the bottom 32 of the stirrups, with the abradable material 38 being disposed onto said support.

FIGS. 2 to 4 in particular show that the supports 40, produced from a plate, have a substantially flat U-shaped cross profile with a wide base 41 substantially extending on the bottom 32 of each stirrup, and two short lateral wings 42 so that the abradable material is suitably deposited. In order to fix the support to the stirrup, a welding operation is preferably carried out between the bottom 32 and the base 41.

The assembly of the stirrups 25 in order to fix the two upstream 20 and downstream 21 rings is undertaken as follows.

Firstly, with such a compressor 1 architecture with a 360° casing, the radial vanes 10 are mounted, via the pivots 14 of the outer ends 11, in the housings 16 of the fixed outer casing 18. Then, the two upstream and downstream rings 20, 21 are disposed on either side of the pivots 15 of the inner end 12 so that their cylindrical half-housings 19 surround the pivots.

At this point, the two back-to-back rings have to be rigidly connected to each other.

In order to achieve this, as shown in FIGS. 4 and 5, each sectored stirrup 25 is introduced inside the two rings 20, 21 and is then radially displaced outwards in the direction of the arrow R of FIGS. 4 and 5. Upon the passage of the edges 26 and 27 of the rings, the inner ledges 36, with the distance separating them being, in the stirrup rest position, less than the width of the edges, move away from each other and then, due to the radial action on the stirrup (arrow R), said stirrup overhangs the edges 26, 27 until the inner ledges 36 resiliently and spontaneously engage in the circumferential notches 37 of the rings 20, 21. At this point, the wings 28, 29 and the bottom 32 of the stirrup 25 are then in place, gripping the edges 26, 27 of the rings by clipping.

Furthermore, in order to correctly place each arc-shaped stirrup sector one after the other around inner peripheral edges 26, 27 of the rings 20, 21 and to prevent their rotation along the edges, rotation stop studs 44 are provided along outer transverse faces 30, 31 of the rings. The studs 44 can be obtained by machining and are evenly angularly spaced relative to each other by a suitable pitch in order to provide the correct assembly of the stirrups.

It is noteworthy, in FIG. 5, that the studs have, viewed as a plan view, a trapezoidal shape that is needed in order to radially engage the stirrups 25 between two consecutive studs, with the transverse end faces 45 of the wings 28, 29 of said stirrups also being slightly oblique and complementing the trapezoidal studs by converging to the outside of the rectifier. In this way, the transverse faces 45 of each stirrup 25 slide between two trapezoidal studs 44 providing the rotational immobilisation of the stirrup.

When the set of elastically deformable stirrups 25 is mounted as shown in FIG. 3, the two upstream 20 and downstream 21 rings are firmly clipped and rigidly connected to each other. In this example, eight stirrups with an angular sector of 45° each are provided. Any other selection could be contemplated without deviating from the scope of the invention.

Furthermore, in order for the abradable material 38 to be completely reconstituted and form a continuous circular assembly with a maximum seal with the strips 39, the bases 41 of the supports 40 of this abradable material are slightly longer than the bottom of the stirrups.

It is also noteworthy that, in order to provide a seal between the consecutive sectored stirrups 25 of abradable material, between which there may be play, the transverse faces 45 of the stirrups can be stepped as shown in FIG. 6.

To this end, an indent 46 is provided in the form of a step on one of the transverse faces 45 of a sector stirrup and an indent 47 is provided in the form of a step that is thus symmetric to the preceding step on the transverse face 45 opposite an adjacent stirrup.

Thus, an axial contact is maintained between the two consecutive stirrups 25 by the right-hand parts 48, 49 of the indents 46, 47 perpendicular to the stepped faces.

This device 22 for connecting upstream 20 and downstream 21 rings to resilient stirrups 25 allows for optimum reduction of the radial spatial requirement of variable pitch rectifiers (and subsequently of the weight) in the case of a 360° casing architecture, without eliminating the inner pivots from the vanes of the rectifiers.

The invention claimed is:

1. A variable pitch rectifier for a compressor, comprising:
    a plurality of radial vanes including outer and inner pivots at outer and inner ends of the vanes, respectively, each of the inner pivots being received, with regard to a gas flow circulating in an upstream to downstream direction of said compressor, between two upstream and downstream inner back-to-back rings that are coaxial to an axis parallel to the upstream to downstream direction and that are fixed together back-to-back in the upstream to downstream direction via a connection device,
    wherein the connection device for connecting the inner back-to-back rings to each other comprises angular sectors of elastically deformable sectored stirrups arranged to grip inner peripheral edges of the upstream and downstream rings by firmly clipping upstream and downstream facing surfaces of the inner back-to-back rings so as to firmly clip the inner back-to-back rings to each other, at least in the upstream to downstream direction, wherein each stirrup comprises opposing wings projecting towards an inside of each stirrup, the wings engaging an upstream facing surface within a transverse notch provided on the upstream facing surface of the upstream ring and a downstream facing surface within a transverse notch provided on the downstream facing surface of the downstream ring.

2. The rectifier according to claim 1, wherein the sectored stirrups have a cross section that is substantially U-shaped or of similar shape.

3. The rectifier according to either claim 1, wherein the sectored stirrups comprise a holding means for holding the clipped inner back-to-back rings.

4. The rectifier according to claim 1, wherein a support for receiving an abradable material is associated with each of the sectored stirrups.

5. The rectifier according to claim 4, wherein each support is fixed by being welded to an outside of a bottom of the corresponding sectored stirrup and extends along the bottom of each stirrup to receive the abradable material.

6. The rectifier according to claim 1, wherein the sectored stirrups are rotationally immobilized relative to the assembled inner back-to-back rings.

7. The rectifier according to claim 6, wherein rotation stop studs laterally project from respective upstream and downstream transverse faces of the assembled inner back-to-back rings and, between two consecutive studs, transverse end faces of a stirrup are engaged.

8. The rectifier according to claim 1, wherein transverse end faces of the stirrups are stepped so that a stepped face of a stirrup cooperates with a complementary stepped face of an adjacent stirrup.

9. The turbine engine compressor comprising an alternating succession of wheels forming rotors and of rectifiers forming a stator, and variable pitch rectifiers according to claim 1.

10. The rectifier according to claim 1, wherein the connection device connects inner back-to-back 360° rings.

11. A variable pitch rectifier for a compressor, comprising:
a plurality of radial vanes including outer and inner pivots at outer and inner ends of the vanes, respectively, each of the inner pivots being received by a bush, the bushes being received between cylindrical half-housings of upstream and downstream rings that are assembled via a connection device,
wherein the connection device for connecting the rings comprises only one set of angular sectors of elastically deformable stirrups arranged to grip inner peripheral edges of the upstream and downstream rings by clipping the inner peripheral edges of the upstream and downstream rings together, each of the stirrups having a substantially U-shaped cross section with lateral and opposing wings,
wherein each of the wings includes an inner ledge respectively projecting towards an inside of each stirrup, the inner ledges engaging an upstream facing surface within a transverse notch provided on an upstream facing surface of the upstream ring and a downstream facing surface within a transverse notch provided on a downstream facing surface of the downstream ring, and
wherein a bottom of at least one of the stirrups abuts a radially inner end of at least one of the bushes and the inner peripheral edges of the upstream and downstream rings.

12. A variable pitch rectifier for a compressor, comprising:
a plurality of radial vanes including outer and inner pivots at their outer and inner ends respectively, each of the inner pivots being received, with regard to a gas flow circulating in an upstream to a downstream direction of said compressor, between two upstream and downstream inner back-to-back rings that are coaxial to an axis parallel to the upstream to downstream direction and that are fixed together back-to-back in the upstream to a downstream direction via a connection device,
wherein said connection device for connecting said inner back-to-back rings to each other comprises angular sectors of elastically deformable sectored stirrups arranged to grip inner peripheral edges of the upstream and downstream rings by firmly clipping said inner back-to-back rings to each other, at least in the upstream to downstream direction, and
wherein each stirrup comprises opposing wings projecting towards an inside of each stirrup, the wings engaging an upstream facing surface within a transverse notch provided on the upstream facing surface of the upstream ring and a downstream facing surface within a transverse notch provided on the downstream facing surface of the downstream ring.

* * * * *

UNITED STATES PATENT AND TRADEMARK OFFICE
CERTIFICATE OF CORRECTION

PATENT NO. : 10,385,872 B2  
APPLICATION NO. : 14/389889  
DATED : August 20, 2019  
INVENTOR(S) : Nadege Hugon et al.

Page 1 of 1

It is certified that error appears in the above-identified patent and that said Letters Patent is hereby corrected as shown below:

In the Claims

Column 8, Line 6, change "engaging an upstream facing surface" to --in upstream or downstream facing surfaces--;

Column 8, Line 7, change "within a transverse notch" to --within transverse notches--;

Column 8, Line 31, change "wings projecting" to --wings and wherein each of the wings includes an inner ledge respectively projecting--;

Column 8, Line 32, change "the wings engaging" to --the inner ledges engaging--;

Column 8, Line 33, change "an upstream facing surface within a transverse" to --in upstream or downstream facing surfaces within transverse--;

Column 8, Line 34, change "notch provided on the upstream" to --notches provided on an upstream--;

Column 8, Line 35, change "and a downstream facing surface within" to --and on a downstream facing surface--; and Column 8, Lines 36-37, change "a transverse notch provided on the downstream facing surface of the downstream ring" to --of the downstream ring--.

Signed and Sealed this  
Thirty-first Day of March, 2020

Andrei Iancu  
*Director of the United States Patent and Trademark Office*